US012383777B2

(12) United States Patent
Ryczek

(10) Patent No.: US 12,383,777 B2
(45) Date of Patent: Aug. 12, 2025

(54) FIRE SUPPRESSION SYSTEMS INCLUDING MODULAR STORAGE TANKS

(71) Applicant: Tyco Fire Products LP, Lansdale, PA (US)

(72) Inventor: Chad L. Ryczek, Oconto Falls, WI (US)

(73) Assignee: Tyco Fire Products LP, Cranston, RI (US)

(*) Notice: Subject to any disclaimer, the term of this patent is extended or adjusted under 35 U.S.C. 154(b) by 0 days.

(21) Appl. No.: 17/062,015

(22) Filed: Oct. 2, 2020

(65) Prior Publication Data

US 2021/0101037 A1 Apr. 8, 2021

Related U.S. Application Data

(60) Provisional application No. 62/968,766, filed on Jan. 31, 2020, provisional application No. 62/910,796, filed on Oct. 4, 2019.

(51) Int. Cl.
*A62C 35/02* (2006.01)

(52) U.S. Cl.
CPC .................................... *A62C 35/02* (2013.01)

(58) Field of Classification Search
CPC ................ B65D 21/02; B65D 21/0201; B65D 21/0209; B65D 1/44-46; A62C 35/02; A62C 35/12; A62C 35/023; F17C 1/08; F17C 2203/011
See application file for complete search history.

(56) References Cited

U.S. PATENT DOCUMENTS

| | | | | | |
|---|---|---|---|---|---|
| 3,659,743 | A * | 5/1972 | Box | B65D 21/0201 | 206/506 |
| 3,878,896 | A * | 4/1975 | White | A62C 35/20 | 239/304 |
| 5,071,100 | A * | 12/1991 | Sweeny | A62C 13/78 | 248/311.2 |
| 5,579,912 | A * | 12/1996 | Yamamoto | B65D 21/0209 | 206/509 |
| D760,443 | S | 6/2016 | Kozlowski | | |
| D760,444 | S | 6/2016 | Kozlowski | | |

(Continued)

FOREIGN PATENT DOCUMENTS

| | | |
|---|---|---|
| CA | 2478559 A1 | 3/2005 |
| CN | 109428029 A | 3/2019 |

(Continued)

OTHER PUBLICATIONS

International Search Report and Written Opinion on International Application No. PCT/IB2020/059295, mail date Jan. 12, 2021, 13 pages.

*Primary Examiner* — Joseph A Greenlund
(74) *Attorney, Agent, or Firm* — Foley & Lardner LLP

(57) ABSTRACT

A modular storage tank assembly including a body defining an internal volume structured to hold a fire suppression agent. The body including multiple planar side portions defining the internal volume, at least one body inlet aperture, and at least one body outlet aperture. The modular storage tank assembly also including a case. The case including a case body, a first flange on a first side of the case body and a second flange on a second side of the case body, at least one case inlet aperture, and at least one case outlet aperture.

16 Claims, 10 Drawing Sheets

(56) References Cited

U.S. PATENT DOCUMENTS 9,364,696 B2 * 6/2016 Kozlowski ............. A62C 13/76
9,555,272 B2 1/2017 Kozlowski
10,391,342 B2 8/2019 Farley et al.
10,463,897 B2 * 11/2019 Dedina .................. A62C 35/13
10,709,917 B2 * 7/2020 An ............................ E04B 1/94
2005/0051575 A1 * 3/2005 Durivage ............... B65D 71/02 222/143
2007/0080089 A1 * 4/2007 Anschutz ........... B65D 21/0201 206/509
2011/0174655 A1 * 7/2011 Gonn ................. B65D 5/48018 206/503
2011/0253396 A1 * 10/2011 Claessen ............ A62C 99/0018 169/46
2013/0284465 A1 * 10/2013 Broidy ................... A62C 33/00 169/51
2014/0034653 A1 * 2/2014 Chang ....................... F17C 1/02 220/581
2015/0231431 A1 * 8/2015 Sandahl ............... A62C 35/023 700/283
2015/0321034 A1 * 11/2015 Qiang ...................... A62C 3/16 169/51
2016/0082297 A1 * 3/2016 Eberlein ............ A62C 99/0018 169/70
2016/0096051 A1 * 4/2016 Baker .................... A62C 37/36 169/46
2016/0206904 A1 * 7/2016 Senecal .................. A62C 35/02
2017/0021213 A1 * 1/2017 Ryczek ................ A62C 35/023
2017/0121056 A1 * 5/2017 Wang ................. B65D 21/0228
2017/0320621 A1 * 11/2017 Yen .................... B65D 21/0209
2018/0147432 A1 * 5/2018 An ......................... A62C 35/02
2019/0037990 A1 * 2/2019 Ayhan ................ B65D 21/0201
2019/0100099 A1 * 4/2019 Jo .................... B60K 15/03006
2019/0249400 A1 * 8/2019 Holbrook ................ E03B 11/02
2020/0369466 A1 * 11/2020 Holden ................ B67D 7/0288
2021/0101037 A1 * 4/2021 Ryczek .................. A62C 35/02
2021/0171238 A1 * 6/2021 Cloutier .................. E02B 3/108

FOREIGN PATENT DOCUMENTS

EP 3 006 092 4/2016
JP H06-292737 10/1994
JP H06-292739 10/1994
WO WO-2015/153714 10/2015
WO WO-2020/112223 A1 6/2020

* cited by examiner

FIRE SUPPRESSION SYSTEMS INCLUDING MODULAR STORAGE TANKS

CROSS-REFERENCE TO RELATED PATENT APPLICATIONS

This application claims the benefit of and priority to U.S. Patent Application No. 62/910,796, filed Oct. 4, 2019, and U.S. Patent Application No. 62/968,766, filed Jan. 31, 2020, the entire disclosures of which are hereby incorporated by reference herein.

BACKGROUND

Fire suppression systems include a fire suppressant (e.g., water, foam, agent, etc.), which suppresses a fire. The fire suppressant is stored in tanks prior to activation of the fire suppression system, and expelled from the tanks during activation of the fire suppression system.

SUMMARY

At least one aspect relates to a modular storage tank assembly for a fire suppression system. The modular storage tank assembly includes a body defining an internal volume structured to hold a fire suppression agent. The body includes multiple planar side portions defining the internal volume, at least one body inlet aperture, and at least one body outlet aperture. The modular storage tank assembly also includes a case. The case includes a case body, a first flange on a first side of the case body, and a second flange on a second side of the case body, at least one case inlet aperture, and at least one case outlet aperture.

At least one aspect relates to a fire suppression system. The fire suppression system includes multiple modular storage tank assemblies. Each modular storage tank assembly includes a body formed by multiple planar wall portions, structured to contain a quantity of fire suppression agent. The fire suppression system also includes at least one cartridge assembly coupled to at least one modular storage tank assembly of the plurality of modular storage tank assemblies to release the fire suppression agent from the at least one modular storage tank assembly. The fire suppression system includes multiple nozzles to receive the fire suppression agent from the at least one modular storage tank assembly, and a controller to control actuation of the at least one cartridge assembly.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
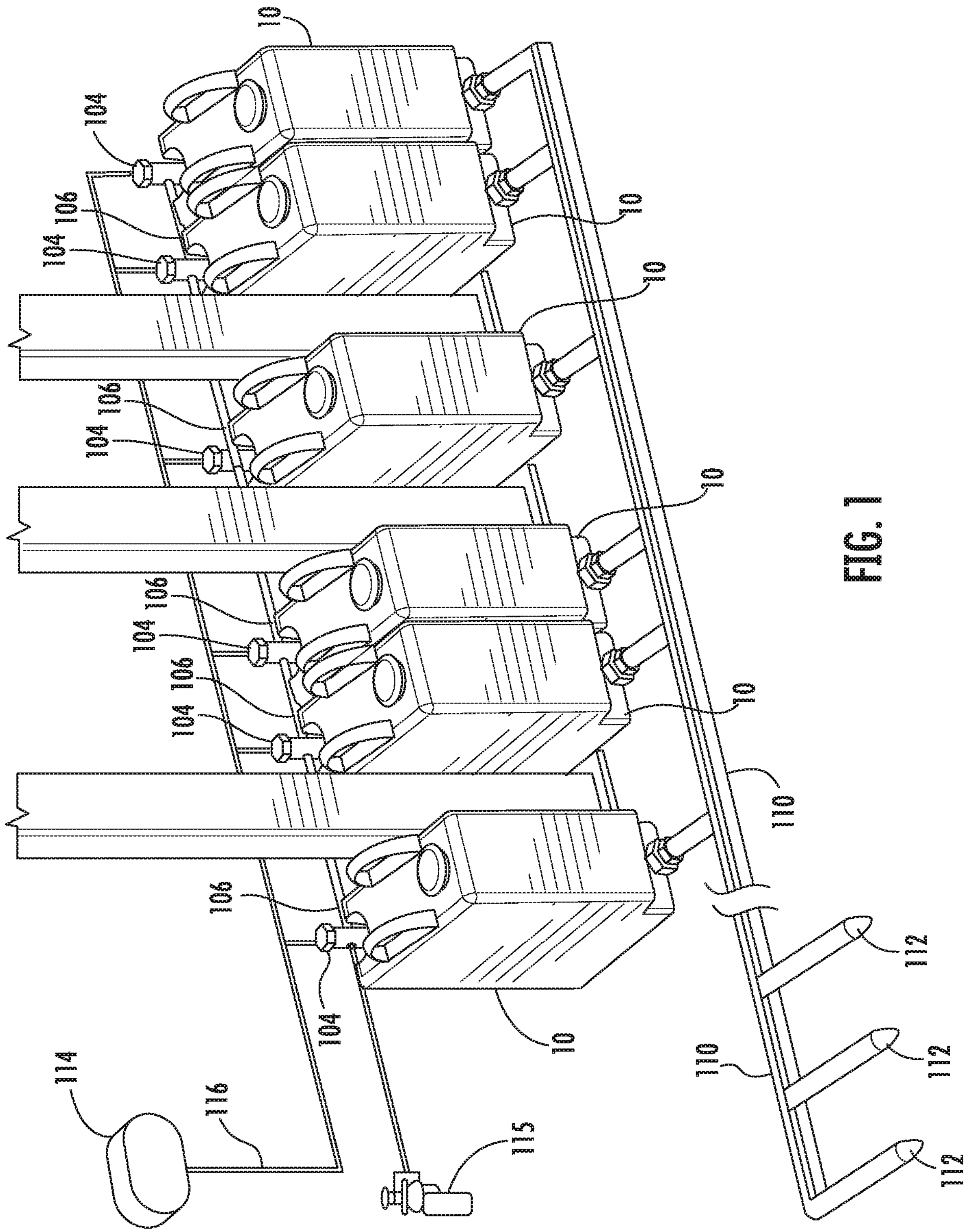
FIG. 1 is a perspective view of an example of a fire suppression system.

The present disclosure relates generally to the field of fire suppression systems, and more particularly to systems of storing fire suppression agent. Following below are more detailed descriptions of various concepts related to, and implementations of fire suppression agent storage containers. Modular storage tank assemblies may be used to vary the quantity of fire suppression agent in a fire suppression system and store the modular storage tank assemblies in compact arrangements. The various concepts introduced above and discussed in greater detail below can be implemented in any of numerous ways, including in new installations as well as retrofits of fire protection systems and sprinklers.

Fires can occur in a hazard area (e.g., engine of a vehicle, kitchen, etc.) when a source of fluid (e.g., engine fluid, grease, etc.) contacts a super-heated surface (e.g., a hot turbo charger, a heated stovetop, etc.). The super-heated surface is above the auto ignition temperature of the fluid, which causes the fluid to ignite and form a fire. Fire suppression systems are implemented near or in hazard areas to prevent or suppress fires (e.g., on a vehicle, in a kitchen, etc.). The fire suppression systems release a fire suppressant (e.g., water, fire suppression agent, etc.) from one or more nozzles onto the fire after activation. The fire suppression agent (e.g., dry chemical, liquid agent, etc.) is stored in tanks and is delivered to the fire by a network of hoses and nozzles. During activation of the fire suppression system, the fire suppression agent suppresses the fire and the fire suppression system continues to release the fire suppression agent to blanket the hazard area and prevent the fire from reigniting.

Different fire suppression systems have a specific required quantity of the fire suppression agent and the fire suppressant tanks are made in specific sizes (e.g., 5-gallon, 10-gallon, and 30-gallon) to fulfill the specific required quantity of fire suppression agent. Each size tank also typically provides suppression agent to a standard quantity of nozzles. If the duration of discharge or the area of coverage needs to be increased, additional nozzles will be added to the hazard area to increase the amount of the fire suppression agent supplied, or the duration of time the fire suppression agent is applied. Additional nozzles require the addition of extra tanks, hardware, hose and/or pipe networks, and replacement components, which results in extra costs and additional space required to house the extra components.

Larger tanks weigh more and require more space than a smaller tank would, which limits where the fire suppressant tank can be installed. Many installation sites (e.g., mines, buildings, etc.) have mandates on the amount of weight which can be lifted, crane access, storage sites, and personnel restrictions regarding work duties, for example. Installation of the fire suppression system may require multiple hours to complete, due to the wait time for a crane that can lift the fire suppressant tanks up onto the installation site, which increases the installation cost of the fire suppression system. A crane may not be available for use in certain applications (e.g., mines), which prevents the fire suppression system from being installed in that application.

A modular storage tank, which has a fixed amount of fire suppression agent (e.g., 1-gallon, 5-gallons, etc.), and can fluidly communicate with one or more other modular tanks, can facilitate easier installation of the fire suppression system. The modular tank allows easier variation of the quantity of fire suppression agent in the fire suppression system via addition or subtraction of tanks. Fire suppression system installers can install the modular tanks without the use of cranes, as each tank is light enough for the installer to carry without assistance (e.g., 50 lbs., etc.). The modular tanks can fit in places that larger tanks cannot, as multiple modular tanks can be spaced throughout an area and hold the same total quantity of suppressant as a larger tank. By way of example, each modular tank requires as little as a 3" of space (e.g., a footprint) to be installed. The modular tanks can be located remote of each other and connected via a hose or pipe network, which further allows for more fire suppression agent to be stored in a fire suppression system as the footprint of an individual modular tank is much smaller than the footprint of a larger tank. By way of example, a 30-gallon tank requires a specific area to store the fire suppressant tank. Six 5-gallon modular tanks can be spaced out, with each modular tank requiring a significantly smaller space than the specific area required for the 30-gallon tank. Further modular tanks can often be located closer to the hazard areas, which could potentially eliminate multiple feet of hosing. Also, smaller quantities of fire suppression agent which are not existing large tank sizes (e.g., 20-gallon, 25-gallon, etc.) can be utilized due to each modular tank being, for example, 5-gallons, or some other smaller volume.

Referring generally to the figures, a modular storage tank assembly (e.g., fire suppressant tank) that can hold a quantity of fire suppression agent is shown. The modular storage tank assembly includes a body, having walls that define an inner volume structured to contain the fire suppression agent. The body may include one or more handles, which facilitate carrying (e.g., moving) of the modular storage tank assembly. A first finish may define a first aperture (e.g., an inlet, outlet, etc.) and be located on a top wall of the body. Alternatively, the first finish may be flush with the surrounding material. The first aperture facilitates filling the inner volume with the fire suppression agent. A cap can be coupled to the first finish or first aperture to seal the first aperture from an ambient environment and limit leaking or spilling of the fire suppression agent. A groove may be included and located on a rear side of the body. The groove may accept a release system (e.g., a cartridge and an actuator). A depression region may be included and located on a front side of the body including a second finish defining a second aperture (e.g., an inlet, outlet, etc.), which allows the fire suppression agent to exit the inner volume during activation of the fire suppression system. Alternatively, the depression region may be omitted and the second finish may be flush with the surrounding material. A conduit may couple to the second finish or the second aperture and align with the second aperture to direct flow of the fire suppression agent out of the inner volume. The conduit can couple to a network of piping to direct the fire suppression agent to one or more nozzles, which release a spray of the fire suppression agent into/onto a hazard area. The first aperture and the second aperture can likewise be defined by the same surface of the body. One or more pairs of apertures (e.g., first aperture and second aperture, etc.) can each be define by a separate wall of the body. Further, positioning of the first aperture and the second aperture and/or the apertures of the pairs of apertures relative to each other facilitates effective fire suppression agent out of a rectangular modular storage tank assembly. Simply reshaping the prior rounded tank shape to the rectangular modular storage tank assembly shape might not allow fire suppression agent to be outputted properly. However, the modular storage tank assemblies in accordance with the present disclosure can allow for proper output of fire suppression agent, while also providing the benefit of increased storage volume as a function of footprint.

The modular storage tank assembly may also include a case. The case can be monolithic with the body or may be separate of and couple to the body. The case can include a first flange on a first side and a second flange on a second side. The first side being opposite to the second side. The first flange can include handles positioned centrally relative to each wall of the body. The first flange can also include fastener apertures that accept a fastener. The fastener apertures can facilitate coupling of multiple modular storage tank assemblies. The second flange can include handles, positioned similar to the handles on the first flange. The second flange can also include cutouts. The cutouts may define a bottom side of the case. The case also includes fluid apertures to align with the first aperture and the second aperture or the pairs of apertures. Caps may be coupled to the case and/or the body to limit access to the inner volume via the first aperture and the second aperture, or the pairs of apertures.

Various aspects disclosed herein relate to a modular storage tank assembly usable with a variety of types of fire suppression systems. The modular storage tank assembly may be smaller than certain other tanks used in connection with fire suppression systems, but may enable users to stack, group, selectively place/locate, or otherwise arrange multiple tank assemblies in desired configurations that may not be possible with other tanks. The body of the modular storage tank assembly can include multiple generally planar side portions that are joined by rounded edge or corner sections. The planar side portions facilitate stacking or closely grouping the modular storage tank assemblies. The body of the modular storage tank assembly (or portions thereof) may have sides that are generally parallel or perpendicular to each other (e.g., in the case of a cube or rectangular prism shaped body). The modular storage tank assembly (or portions thereof) may have sides that are angled relative to each other (e.g., in the case of a modular storage tank assembly with a triangular or trapezoidal cross-section). Relative to generally cylindrical tank configurations, the modular storage tank assembly may provide improved positioning/locating options for users.

Referring to FIG. 1, a fire suppression system 100 is depicted. The fire suppression system 100 dispenses or distributes a fire suppression agent onto and/or nearby a fire, suppressing the fire and preventing the fire from spreading. The fire suppression system 100 contains a quantity of fire suppression agent stored within a container prior to dispensing or distribution of the fire suppression agent.

The fire suppression system 100 can be used in a variety of different applications. Different applications can require different types of fire suppression agent and different quantities of fire suppression agent. The fire suppression system 100 is usable with a variety of different fire suppression agents, such as liquids, foams, or other fluid or flowable materials. The fire suppression system 100 can be used in a variety of stationary applications. By way of example, the fire suppression system 100 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, the fire suppression system 100 can be used in a variety of mobile applications. By way of example, the fire suppression system 100 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Referring again to FIG. 1, the fire suppression system 100 includes one or more containers, shown as modular storage tank assemblies 10. A single, standalone tank may be used, or alternatively, multiple tanks may be operatively coupled together. The modular storage tank assemblies 10 may be coupled to one or more conduits, shown as pipes 110. The pipes 110 fluidly couple the modular storage tank assemblies 10 to one or more outlets, shown as nozzles 112. The pipes 110 are positioned to direct fire suppression agent to the nozzles 112 during activation of the fire suppression system 100 and the nozzles 112 are positioned to direct a spray of fire suppression agent onto a hazard area or fire. The modular storage tank assemblies 10 include a fluid release assembly, shown as actuator 104, which in response to a stimulus (e.g., signal), facilitates release of a gas into an inner volume of the modular storage tank assembly 10. The release of gas into the inner volume forces a quantity of fire suppression agent out of the inner volume and into the pipe 110. The actuators 104 of each modular storage tank assembly 10 are coupled via a conduit, shown as communication pipe 106. The communication pipe 106 is positioned to communicate an activation signal (e.g., a pneumatic signal, etc.) from a first actuator 104 to a second actuator 104 when the activation is caused by a manual activation device 115. A control module, shown as controller 114, is configured to facilitate electric activation of the fire suppression system 100. In response to an indication that a fire is present, the controller 114 sends a signal to the actuator 104 via a wire 116, to activate the actuator 104.

The modular storage tank assembly 10 defines an inner volume filled (e.g., partially, completely, etc.) with a material (e.g., fire suppression agent). The fire suppression agent may normally not be pressurized (e.g., is near atmospheric pressure). The modular storage tank assembly 10 further includes the cartridge and the actuator 104. The cartridge defines an inner volume structured to contain a volume of material (e.g., pressurized expellant gas). The expellant gas may be an inert gas. The expellant gas may be air, carbon dioxide, or nitrogen. The actuator 104 is coupled to the cartridge 102 and both may be included in the modular storage tank assembly 10. The actuator 104 and the cartridge can be fluidly coupled to the inner volume of the modular storage tank assembly 10 via a conduit (e.g., a pipe, a tube, a hose, etc.) allowing a flow of expellant gas into the inner volume of the modular storage tank assembly 10. Multiple modular storage tank assemblies 10 may also be actuated by a single cartridge and actuator 104. The cartridge and/or the actuator 104 may be removed from the modular storage tank assembly 10 to facilitate removal and replacement (e.g., changing) of the cartridge and/or the actuator 104 after activation of the fire suppression system 100. Decoupling the cartridge from the actuator 104 may also facilitate removal and replacement of the cartridge when the cartridge is depleted. The cartridge and the actuator 104 may also be positioned remote of the modular storage tank assembly 10 or multiple modular storage tank assemblies 10 and connected via a conduit.

The actuator 104 selectively fluidly couples the cartridge to the inner volume of the modular storage tank assembly 10. The actuator 104 can include one or more valves that selectively fluidly couple the cartridge to the inner volume. The cartridge can be sealed, and the actuator 104 includes a pin, knife, nail, or other sharp object that the actuator 104 forces into contact with the cartridge to puncture the outer surface of the cartridge, fluidly coupling the cartridge with the actuator 104. Once the actuator 104 is activated and the cartridge is fluidly coupled to the modular storage tank assembly 10, the expellant gas from the cartridge flows freely through the actuator 104 and into the modular storage tank assembly 10.

As described above, the expellant gas forces fire suppression agent from the modular storage tank assembly 10, into the pipe 110. The fire suppression agent flows from the modular storage tank assembly 10, through the pipe 110, and to the nozzles 112. The nozzles 112 each define one or more apertures, through which the fire suppression agent exits, forming a spray of fire suppression agent that can cover a desired area. The fire suppression agent released from the nozzles 112 suppresses or extinguishes the fire within an area.

The actuators 104 of the modular storage tank assemblies 10 can be fluidly coupled together by the communication pipe 106. The communication pipe 106 couples to an aperture in each of the actuators 104, which allows fluid communication between one actuator 104 and subsequent actuators 104. When the fire suppression system 100 is activated via a manual activation device 115, a pneumatic signal is sent to first actuator 104 of first modular storage tank assembly 10. The first actuator 104 punctures the cartridge and pneumatic signal is directed through the communication pipe 106 of the first modular storage tank assembly 10 to a subsequent actuator 104. The subsequent actuator 104 activates in response to receiving the pneumatic signal, and after activation direct the pneumatic signal to a next subsequent actuator 104. Each subsequent actuator 104 receives the pneumatic signal via the communication pipe 106 from a previous actuator 104, and activates in response to receiving the pneumatic signal.

Figure 2:
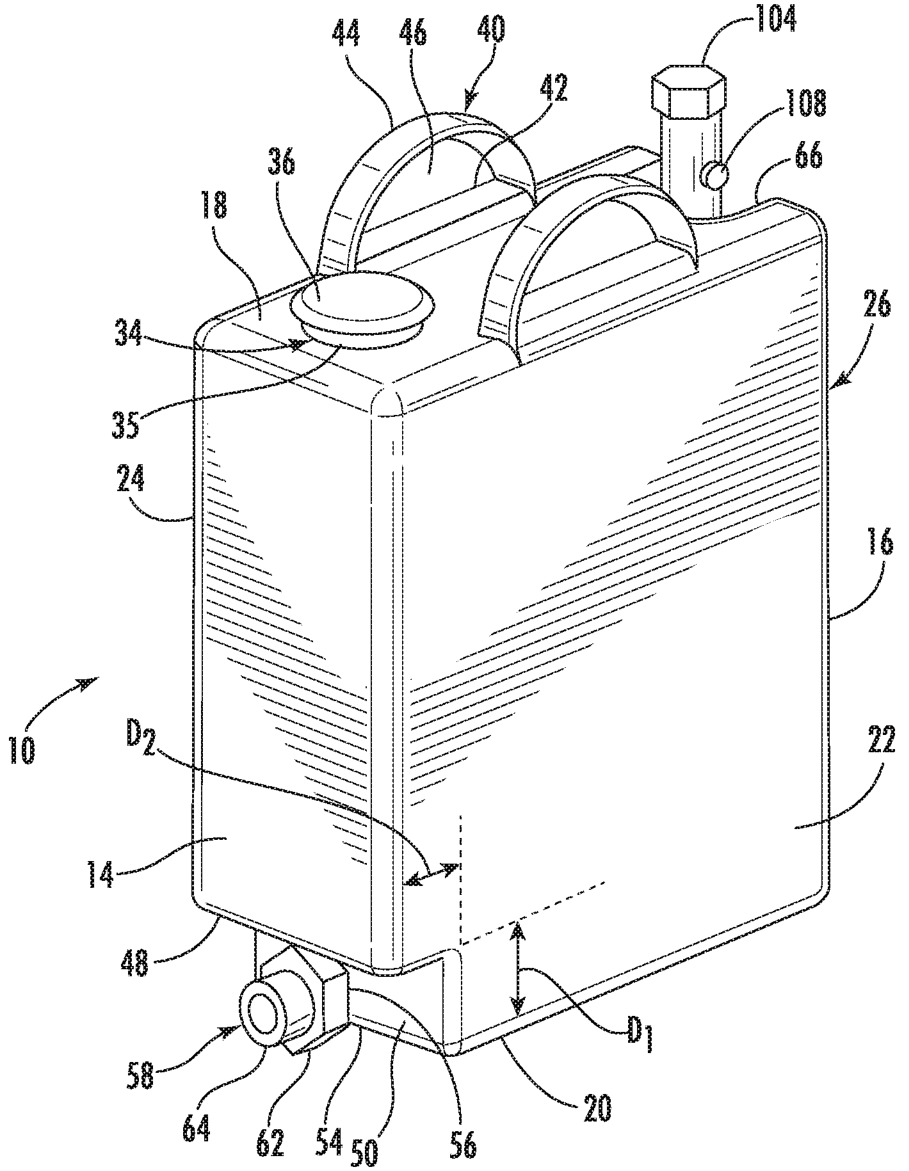
FIG. 2 is a perspective view of an example of a modular storage tank assembly usable with a fire suppression system.
Figure 3:
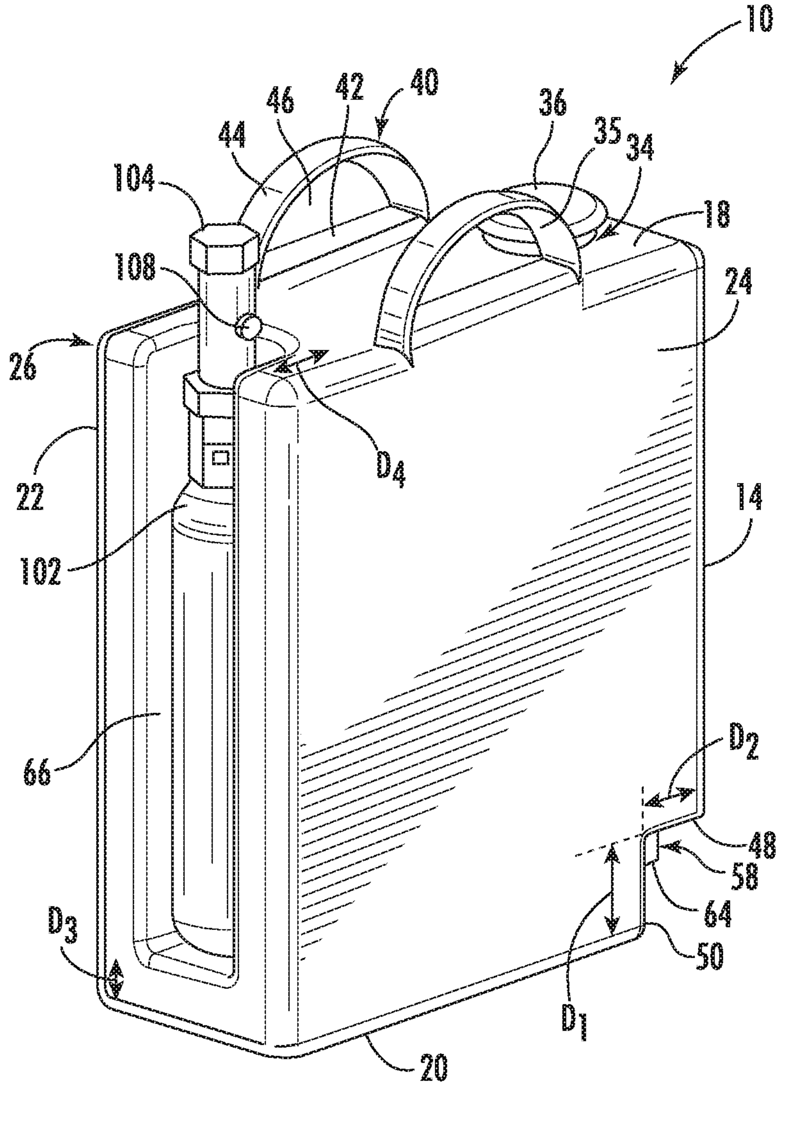
FIG. 3 is a perspective view of an example of a modular storage tank assembly.
Figure 4:
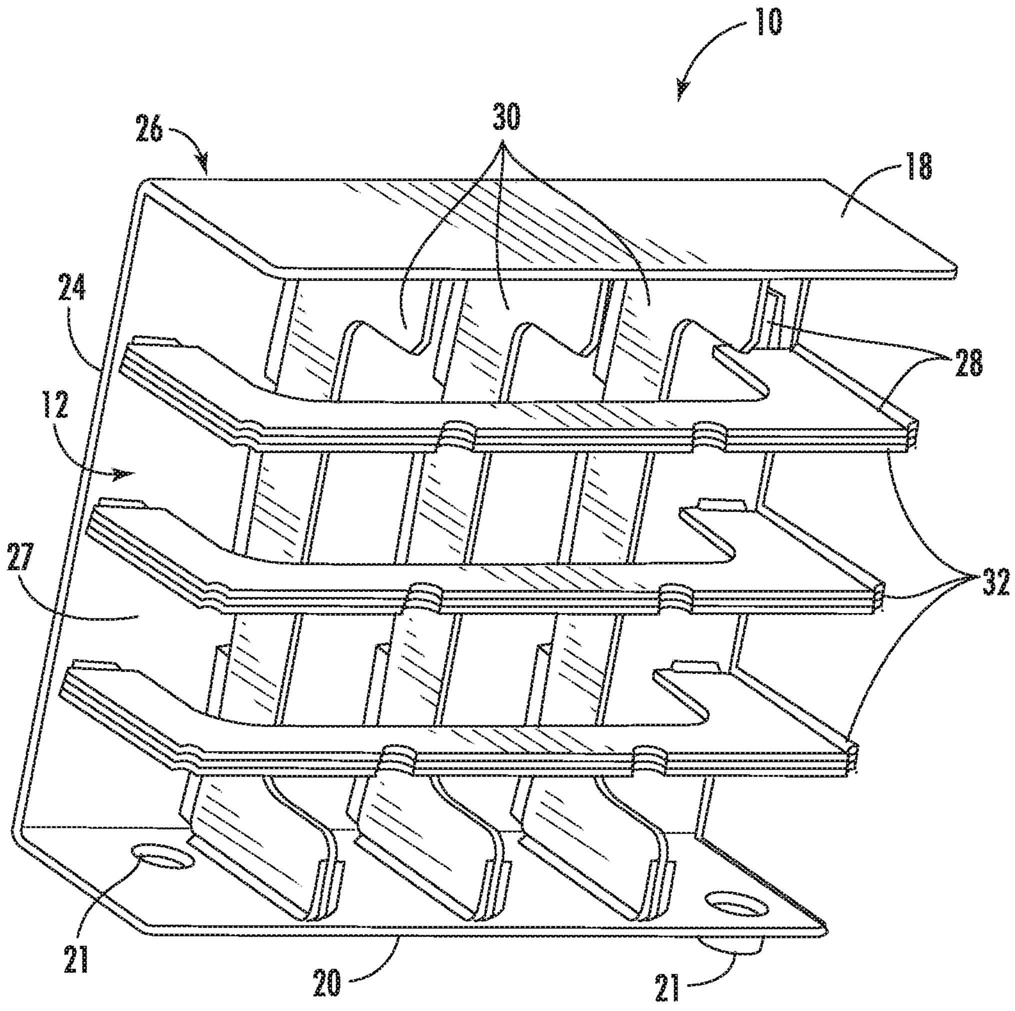
FIG. 4 is a section view of an example of a modular storage tank assembly.
Figure 6:
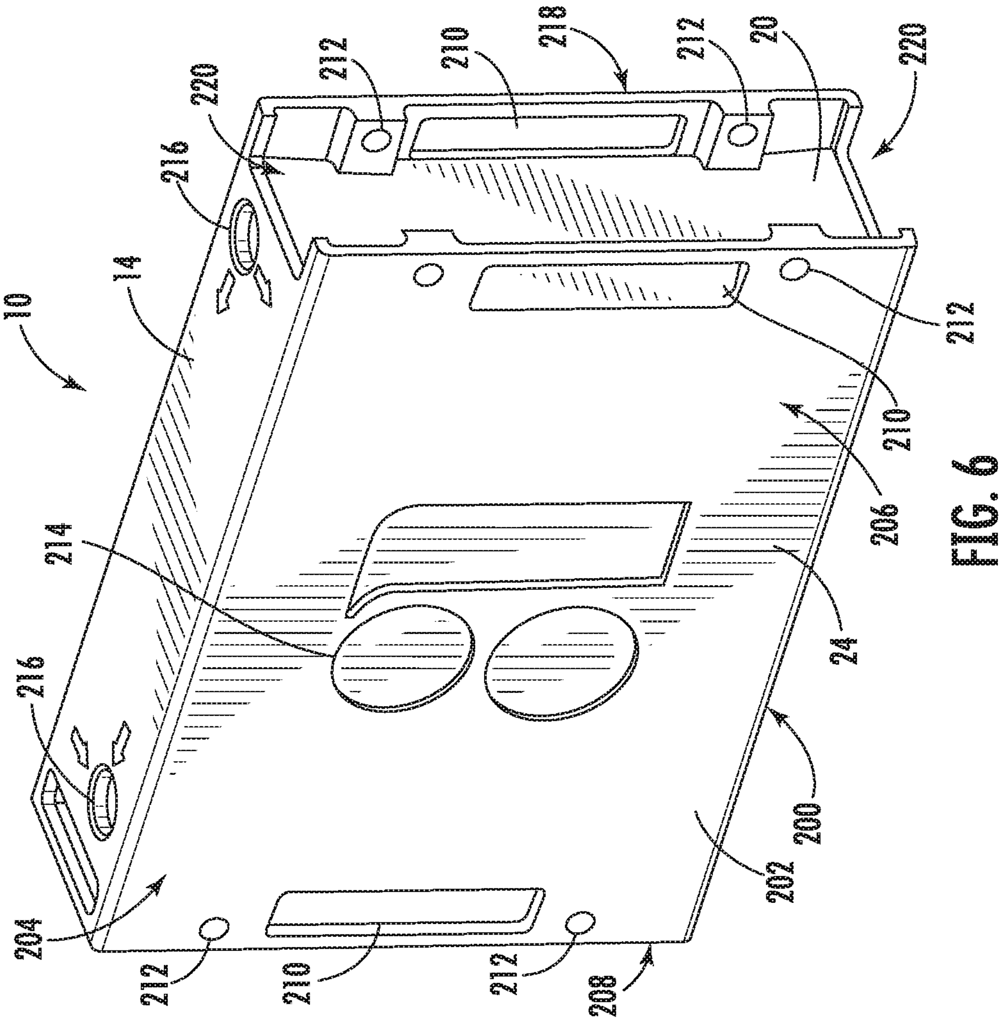
FIG. 6 is a back view of an example of a modular storage tank assembly.
Figure 5:
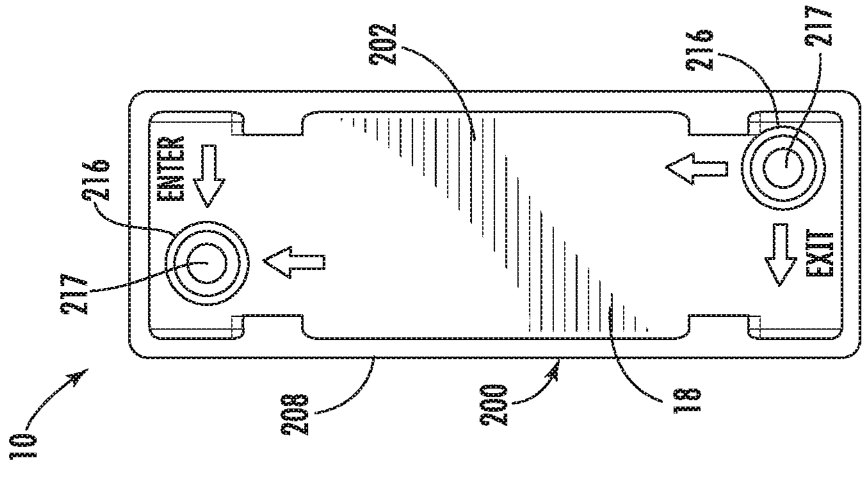
FIG. 5 is a perspective view of an example of a modular storage tank assembly.
Figure 8:
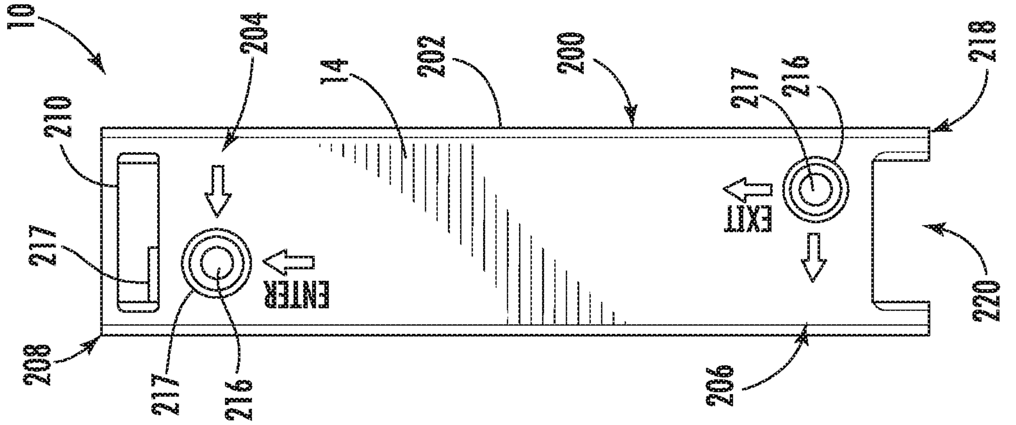
FIG. 8 is a front view of an example of a modular storage tank assembly.
Figure 7:
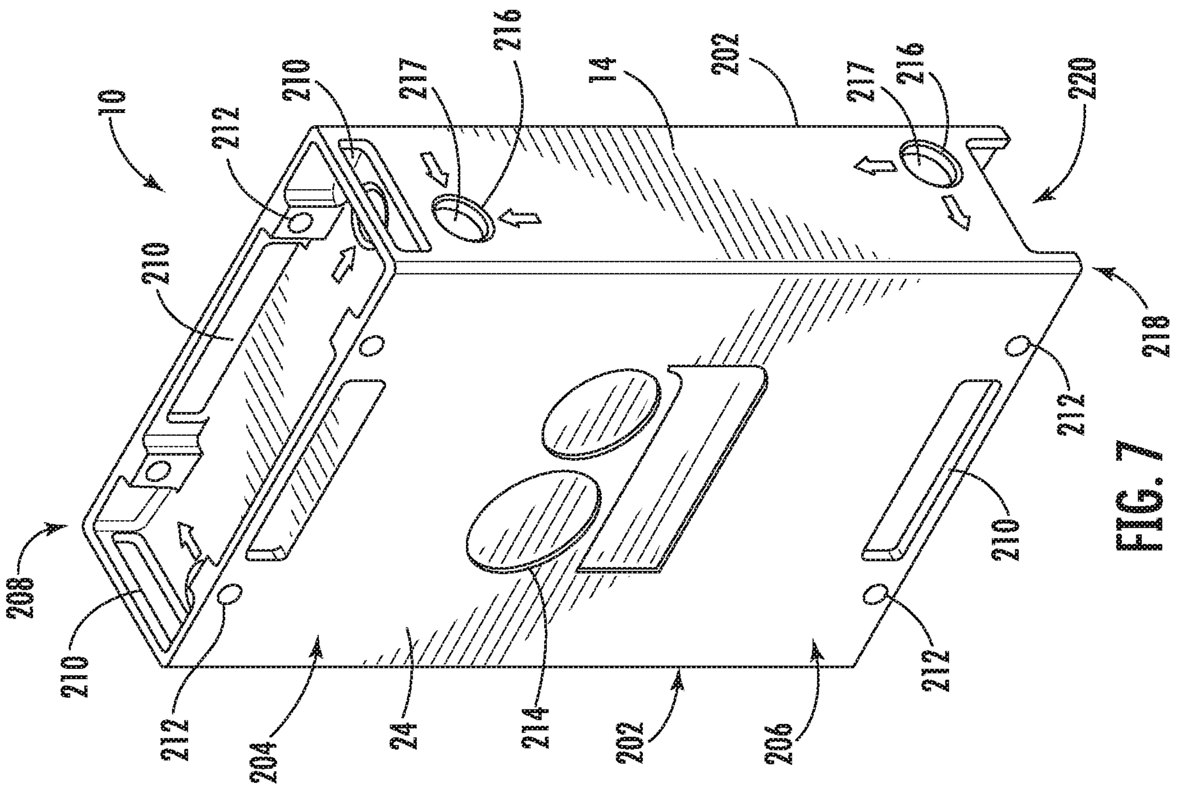
FIG. 7 is a perspective view of an example of a modular storage tank assembly.
Figure 9:
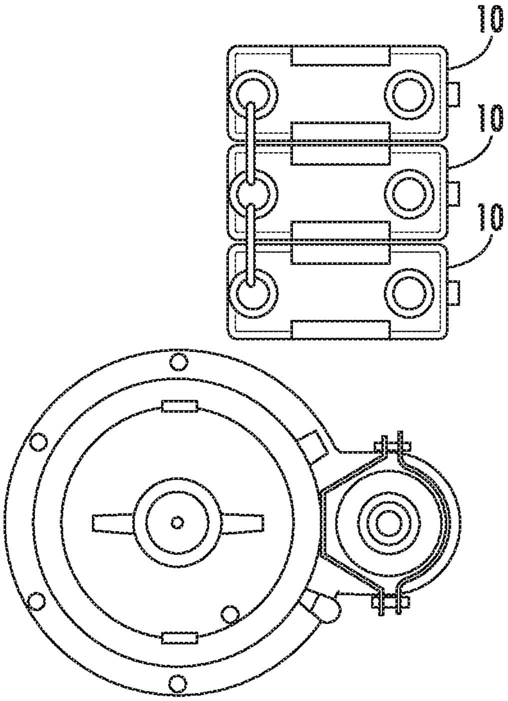
FIG. 9 is a perspective view of an example of a first arrangement of multiple modular storage tank assemblies.
Figure 10:
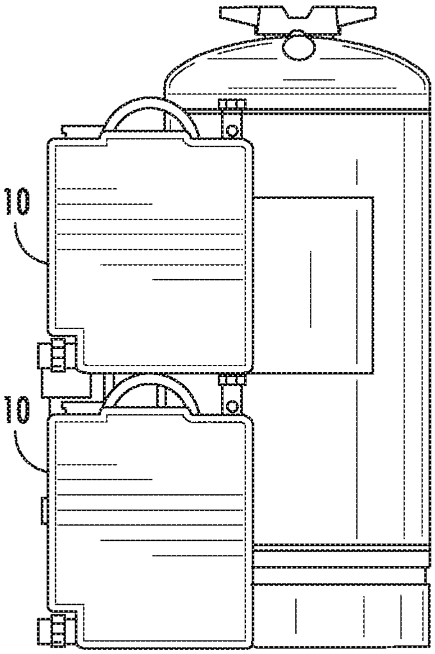
FIG. 10 is a perspective view of an example of a first arrangement of multiple modular storage tank assemblies.

Referring to FIGS. 2-4, the modular storage tank assembly 10 fire suppression system 100 is depicted in greater detail. The modular storage tank assembly 10 is structured to hold a quantity of fluid (e.g., water, fire suppression agent, etc.) and further allow egress of the fluid to one or more components of the fire suppression system 100. The modular storage tank assembly 10 can be used with the fire suppression system 100, a watering system, any other system that includes a reservoir of fluid, or as a stand-alone tank, for example. The modular storage tank assembly 10 further facilitates fluid communication between the fire suppression agent and a network of piping, and/or one or more nozzles. The modular storage tank assembly 10 can be coupled to one or more modular storage tank assemblies 10 to increase the quantity of fire suppression agent in the fire suppressant system. The modular storage tank assembly 10 can be replaced with a new modular storage tank assembly 10 post activation of the fire suppression system 100. The modular storage tank assembly 10 can be refilled with the fire suppression agent if the quantity of fire suppression agent within the modular storage tank assembly 10 diminishes (e.g., due to activation of the fire suppression system 100). Suitable materials for the modular storage tank assembly 10 may be, for example, metal or plastic.

The modular storage tank assembly 10 generally includes a body 26 that defines a cavity, shown as an inner volume 12. The body 26 is formed by one or more generally planar side portions. The generally planar side portions can include a front wall 14, back wall 16, top wall 18, bottom wall 20, first side wall 22, and second side wall 24. The front wall 14 and the back wall 16 can be spaced opposite of each other to define two sides bounding the inner volume 12 on one side by the front wall 14 and on an opposite side by the back wall 16. The top wall 18 and the bottom wall 20 extend between the front wall 14 and the back wall 16 to define two other sides of the inner volume 12. The top wall 18 and the bottom wall 20 are adjacent to the front wall 14 and the back wall 16, and are spaced opposite each other. The first side wall 22 and the second side wall 24 extend between the front wall 14 and the back wall 16, and the top wall 18 and the bottom wall 20, and are spaced opposite each other, to define two more sides of the internal volume.

A first wall in an opposing pair of walls (e.g., the front wall 14 and the back wall 16, the top wall 18 and the bottom wall 20, the side walls, etc.) can extend parallel to a second wall in the opposing pair of walls (e.g., the front wall 14 extends parallel to the back wall 16, etc.). A quadrilateral cross-section (e.g., a square, a rectangle, a rhombus, etc.) of the body 26 is formed when every first wall is parallel to the second wall of each opposing pair of walls. The opposing pair of walls can extend perpendicularly to an adjacent opposing pair of walls (e.g., the front wall 14 and the back wall 16 extend perpendicularly to the top wall 18 and the back wall 16, etc.) to form a quadrilateral cross-section of the body 26 with equal corner angles (e.g., a rectangle, a square, etc.). Each wall (e.g., front wall 14, back wall 16, etc.) can be equal in size to form a normal polygon cross-section of the body 26 (e.g., a square). The body 26 (or portions thereof) may have one or more side walls that are angled relative to each other (e.g., in the case of a body 26 with a triangular or trapezoidal cross-section). Each intersection (e.g., corner) between the walls (e.g., the front wall 14 and the top wall 18, etc.) can be rounded (e.g., beveled, etc.), to prevent stress concentrations at the corners. The bottom wall 20 can include one or more protrusions, shown as feet 21, which distance the bottom wall 20 from a ground.

The modular storage tank assembly 10 can include a first shell member and a second shell member that, when coupled, form the body 26. An attachment region (e.g., seam, joint, etc.) can form between the first shell member and the second shell member at an area where the first shell member couples to the second shell member. The first shell member and the second shell member couple (e.g., fixedly, removably, sealably, etc.) to form the top wall 18, bottom wall 20, the first side wall 22, the second side wall 24, front wall 14, and back wall 16, which define the inner volume 12. The first shell member and the second shell member can be coupled via adhesive, welding, or fastener, for example. The first shell member can include a single wall (e.g., one of the front wall 14, the back wall 16, the top wall 18, the bottom wall 20, the first side wall 22, or the second side wall 24), and the second shell member then includes each wall not included in the first shell member (e.g., in the form of a polygonal (e.g., square, rectangle, rhombus, etc.) body with an open side (e.g., bucket, pail, etc.)). The first shell member couples to the second shell member to form the modular storage tank assembly 10 and the inner volume 12. A seam is formed along an edge where the first shell member and the second shell member couple. The seam can bisect at least three of the top wall 18, the bottom wall 20, the front wall 14, the back wall 16, the first side wall 22, and the second side wall 24. By way of example the first shell member may include a first portion of the top wall 18, and the second shell member may include a second portion of the top wall 18 to the extent that, when the first shell member and the second shell member are coupled, the entire top wall 18 is formed.

The body 26 may be formed by a single shell. The single shell defines the inner volume 12 and includes the front wall 14, the back wall 16, the top wall 18, the bottom wall 20, the first side wall 22, and the second side wall 24. The single shell can be formed from a metal (e.g., aluminum, steel, etc.), or from a rigid plastic (e.g., PVC, etc.). The single shell can be formed via a manufacturing method (e.g., casting, extruding, molding, forming, etc.) to the extent that the single shell is formed as a single piece.

Referring to FIG. 4, the modular storage tank assembly 10 may include one or more support members, shown as ribs 28 (e.g., baffles, internal supports, etc.). The ribs extend along an inside surface 27 of one or more of the walls. The ribs 28 can extend between the inside surface 27 of one the walls to the inside surface of another of the walls (e.g., adjacent walls, opposite walls, etc.). The ribs 28 can couple to four or more walls (e.g., U-shape), to three or more walls (e.g., L-shape), or to two or more walls (I-shape) and may limit deformation of the walls. Each rib 28 fixedly couples to at least two walls, which substantially prevents the coupled walls from moving or deforming relative to each other by supplying a force to the coupled walls, opposite and equal to forces exerted on the modular tank 10 by an article (e.g., fire suppression agent, pressurized gas, installation tools, etc.) that exerts a force on the modular storage tank assembly 10 (e.g., internal forces due to an increase of pressure in the inner volume 12, external force due to an object impacting the body 26, etc.). The ribs 28 can extend in various orientations (e.g., each rib 28 can be rotated in relation to the other ribs 28).

By way of example, the ribs 28 may be U-shaped. A first group of ribs 30 can include ribs 28 extending from the top wall 18 to the bottom wall 20 (e.g., longitudinally), and fixedly couple the first side wall 22, the top wall 18, the bottom wall 20, and the second side wall 24. Each of the ribs 28 of the first group of ribs 30 are spaced apart along the body 26. A second group of ribs 32 can include the ribs 28 extending from the front wall 14 to the back wall 16 (e.g., laterally), and fixedly couple the second side wall 24, the front wall 14, the back wall 16, and the first side wall 22. Each of the ribs 28 of the second group of ribs 32 are spaced apart along the body 26. The first group of ribs 30 can extend perpendicularly (e.g., rotated 90°) to the second group of ribs 32.

The modular storage tank assembly 10 includes a cylindrical protrusion, shown as first finish 34, positioned on, and extending outwardly from one of the walls of the body 26. The first finish 34 defines an opening (e.g., inlet, outlet, etc.), shown as first aperture 38. Alternatively, the first finish 34 may be flush with the surrounding material. The first finish 34 includes a first neck 35, to which a sealing member, shown as cap 36, can couple. The first neck 35 of the first finish 34 can include external threads which facilitate sealingly coupling of the cap 36 to the body 26. The cap 36 can seal (e.g., limit egress or ingress of material) the first aperture 38 from an ambient environment when the cap 36 is coupled to the first finish 34. The first aperture 38 facilitates egress or ingress of a material out of and/or into the inner volume 12 of the body 26. By way of example, the user can at least partially fill the inner volume 12 with the fire suppression agent by pouring the fire suppression agent into the inner volume 12 via the first aperture 38. By way of example, the first finish 34 and first aperture 38 are located on the top wall 18 of the body 26 and closer to the front wall 14 than the back wall 16, which allows filling of the inner volume 12 after installation, as the orientation of the modular storage tank assembly 10 does not need to be changed to fill the inner volume 12 (e.g., the first finish 34 and the first aperture 38 located on the first side wall 22, etc.).

The body 26 of the modular storage tank assembly 10 also may include one or more elongated protrusions, shown as handles 40 (e.g., a handle portion, etc.), located on, and extending outward from one of the walls of the body 26. The handles 40 are structured to assist the user while moving the modular storage tank assembly 10 by forming accessible regions for the user to exert a force and lift the modular storage tank assembly 10 without changing the orientation of the modular storage tank assembly 10 (e.g., tilting the modular storage tank assembly 10 so the user can place an object beneath the modular storage tank assembly 10 to lift the modular storage tank assembly 10). The handles 40 can include a base 42, which couples to the wall, and an appendage 44, which extends from a first side of the base 42 to a second side of the base 42. An opening is defined between the base 42 and the appendage 44, shown as carrying aperture 46. The carrying aperture 46 is structured to allow an object (e.g., a hand, a rod, a strap, etc.) to extend between the base 42 and the appendage 44 of at least one of the handles 40 to facilitate exerting a force on the appendage 44 of the handle 40, to move (e.g., lift, slide, etc.) the modular storage tank assembly 10.

The handles 40 can be aligned, such that a single object can extend through each carrying aperture 46 of the handles 40 and exert a force on both of the handles 40. The handles 40 can be positioned on a periphery (e.g., an outside edge) of at least one of the walls (e.g., the top wall 18), and on or near edges of the wall to facilitates exertion of the force along an edge of the wall, which prevents deformation of the walls. By way of example, the handles 40 can assist the user during moving of the modular storage tank assembly 10, and may be positioned on the periphery of the top wall 18, opposite each other, and each at a center of each edge, along the length, of the top wall 18. The handles 40 can be a separate component of the walls of the body 26 and can be fixedly coupled (e.g., welded, etc.) to at least one of the walls of the body 26. Forming the handles 40 separate of the walls facilitates positioning of the handle 40 on the body 26 for specific installation (e.g., different locations of the handle 40). The handles 40 can be included (e.g., integrally formed) in at least one of the walls during manufacturing to the extent that the wall and the handle 40 form a single component, shortening time required for manufacturing of the modular storage tank assembly 10.

The modular storage tank assembly 10 also may include a first wall 48, which extends perpendicularly inward from the front wall 14 and is located at a distance $D_1$ above the bottom wall 20. The modular storage tank assembly 10 may include a second wall 50, which extends perpendicularly inward (e.g., upward) from the bottom wall 20 and is located at a distance $D_2$ back from the front wall 14. The distance $D_1$ and the distance $D_2$ can be the equal, or different. The first wall 48 and the second wall 50 can define a depression region 52 in the body 26 of the modular storage tank assembly 10. The depression region 52 can be located at an intersection (e.g., a corner) of at least two walls of the body 26. The depression region 52 can extend inwardly, which results in a decrease of the inner volume 12 of the modular storage tank assembly 10.

A second cylindrical protrusion, shown as second finish 54, can be located on the second wall 50 and extends perpendicularly outward of an outer surface of the second wall 50. Alternatively, the depression region 52 may be omitted and the second finish 54 may be flush with the surrounding material. The second finish 54 can define an opening, shown as second aperture 60 (e.g., an inlet, outlet, etc.), extending through the second wall 50. The second aperture 60 facilitates fluid communication between the inner volume 12 and an environment (e.g., ambient environment, piping, etc.) external to the modular storage tank assembly 10 and facilitate egress of fire suppression agent stored within the modular storage tank assembly 10. The second finish 54 includes a second neck 56 that can include outer threads. The second neck 56 can be structured to facilitate coupling of a pipe connector, shown as conduit 58, to the body 26 of the modular storage tank assembly 10. The conduit 58 includes a hexagonal region 62, which can accept a tool (e.g., a wrench) to assist rotation of the conduit 58 during coupling of the conduit 58 to the second finish 54, and an elongated cylindrical projection, shown as outlet 64, which can couple to the pipe 110 and facilitate directing the egress of fire suppression agent from the inner volume 12. The conduit 58 sealingly couples to the second finish 54 and to the pipes 110, which facilitates fluid communication between the modular storage tank assembly 10 and the pipes 110.

An elongated indent, shown as groove 66, can be included in the body 26 of the modular storage tank assembly 10. The groove 66 can be located opposite the depression region 52 on the body 26 (e.g., the depression region 52 can be toward a front, the groove 66 can be toward a back). The groove 66 can extend through the top wall 18 to a distance $D_3$ from the bottom wall 20. The groove 66 can have a curved profile and recess a distance $D_4$ from a surface of the back wall 16 of the body 26. The groove 66 is structured to accept the cartridge 102 and the actuator 104. The cartridge 102 and the actuator 104 can be completely contained within the groove 66 to the extent that the cartridge 102 and the actuator 104 do not extend past (e.g., recessed from, flush with, etc.) the surface of the back wall 16. The cartridge 102 and the actuator 104 can be contained partially in the groove 66 to the extent that the cartridge 102 and the actuator 104 extend past the surface of the back wall 16. Alternatively, the groove 66 may be omitted and the cartridge 102 and the actuator 104 may be positioned remote of the modular storage tank assembly 10 or the cartridge 102 and the actuator 104 may be coupled to a wall of the body 26 (e.g., the top wall 14, the bottom wall 16, the front wall 18, the back wall 20, the first side wall 22, the second side wall 24, etc.). As described above, the cartridge 102 and the actuator 104 release a gas into the inner volume 12 and force the fire suppression agent out of the inner volume 12. The cartridge 102 and the actuator 104 can be fluidly coupled to the inner volume 12 of the modular storage tank assembly 10 via an aperture defined within the groove 66. The gas released by the cartridge 102 flows through the aperture into the inner volume 12 and forces the fire suppression agent out of the inner volume 12 via the second aperture 60. Further, multiple modular storage tank assemblies 10 may be actuated by a single cartridge 102 and actuator 104, which are remotely located and coupled via a conduit to the multiple modular storage tank assemblies 10.

Referring to FIGS. 5-8, the modular storage tank assembly 10 is depicted. The modular storage tank assembly 10 can include a case 200. The case 200 can interface with the body 26. The body 26 and the case 200 can be a monolithic structure (e.g., a single piece, etc.). The body 26 and the case 200 can be formed as separate structures and coupled during manufacturing of the modular storage tank assembly 10. The case 200 can interface with other cases 200 of other modular storage tank assemblies 10. Suitable materials of the case may be, for example, plastic and/or metal.

The case 200 includes a case body 202. The case body 202 can interface with or define the body 26. Therefore, the case body 202 can also define the inner volume 12, the front wall 14, the back wall 16, the top wall 18, the bottom wall 20, the first side wall 22, and the second side wall 24. The case body 202 can include a body mark 214. The body mark 214 can be an indent, or a protrusion shaped in a logo, or other branding mark. The case body 202 also includes one or more fluid apertures 216. The fluid apertures 216 can be positioned in pairs, for example, two fluid apertures 216 per side of the case body 202. Each fluid aperture 216 can be an inlet and/or an outlet for fire suppression agent. Each side of the case body 202 can include two fluid apertures 216. One fluid aperture 216 can be an inlet. The other fluid aperture 216 can be an outlet. The fluid apertures 216 align with the first aperture 38 and the second aperture 60 of the body 26. The fluid apertures 216 can accept a conduit (e.g., a hose, a pipe, etc.) that interfaces with the first aperture 38 and/or the second aperture 60. The fluid apertures 216 and/or the first aperture 38 and the second aperture 60 may each include a cover 217 (e.g., cap 36, etc.) to limit access to the inner volume 12.

For example, a first pair of apertures includes a first aperture (e.g., first aperture 38, an inlet, etc.) defined by the front wall 14, located closer to the top wall 18 and the second side wall 24 and a second aperture (e.g., second aperture 60, an outlet, etc.) defined by the front wall 14, located closer to the bottom wall 20 and the first side wall 22. A second pair of apertures includes a first aperture (e.g., first aperture 38, an inlet, etc.) defined by the top wall 18, located closer to the front wall 14 and the first side wall 22 and a second aperture (e.g., second aperture 60, an outlet, etc.) defined by the top wall 18, located closer to the back wall 16 and the second side wall 24. The case 200 includes fluid apertures 216 positioned over the first pair of apertures and the second pair of apertures. The modular storage tank assembly 10 can be oriented such that the second side wall 24, the bottom wall 20, and/or the back wall 16 interface with a ground or are positioned closer to the ground than the other walls of the body 26. The first apertures are positioned to be above the second apertures to allow a maximum quantity of fire suppression agent stored within the inner volume 12, to be expelled.

The case body 202 has a first end 204 and a second end 206. The first end 204 is opposite the second end 206. The first end 204 can include a first flange 208. The first flange 208 extends from a perimeter of the case body 202. The first flange 208 can include at least one handle 210. The handles 210 can be positioned centrally relative to a dimension of each side (e.g., width, height, length, etc.). Each handles 210 is defined by an aperture extending through the first flange 208 to allow an object (e.g., a hand, a strap, a hook, etc.) to extend through the first flange 208. The handles 210 are positioned to help a user interface with the case body 202 to, for example, move the modular storage tank assembly 10. The first flange 208 also includes fastener apertures 212. The fastener apertures 212 can accept a fastener through. The first flange 208 may have a larger thickness surrounding the fastener apertures 212 to minimize deformation of the first flange 208 during acceptance of a fastener.

The case body 202 can include a second flange 218 extending from the second end 206. The second flange 218 can include at least one handle 210, defined by apertures extending through the second flange 218. The second flange 218 also includes cutouts 220. The cutouts 220 may be positioned on adjacent sides relative to the handles 210. The cutouts 220 may be positioned to interface with a bracket that couples and secures the case 200 in a predetermined orientation. The second flange 218 may define a bottom couple to the bracket or a base surface (e.g., ground, floor, etc.). The cutouts 220 may also assist a user when installing the modular storage tank assembly 10 by providing a visual indication of a top and bottom of the modular storage tank assembly 10. The second flange 218 also includes fastener apertures 212.

Figure 11:
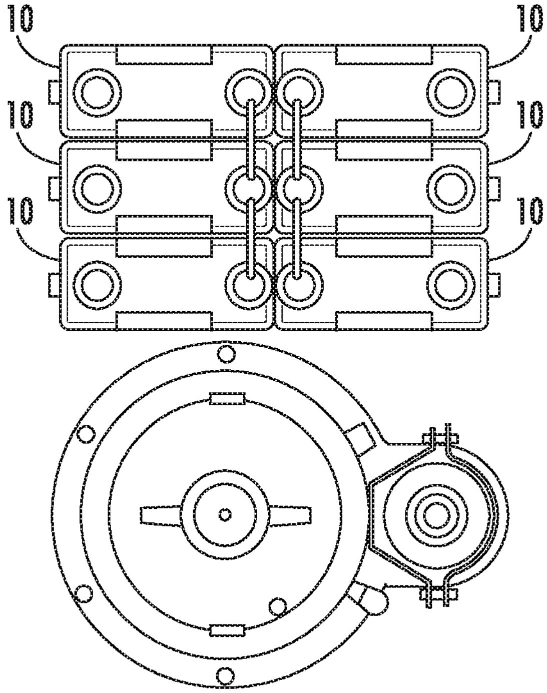
FIG. 11 is a perspective view of an example of a second arrangement of multiple modular storage tank assemblies.
Figure 12:
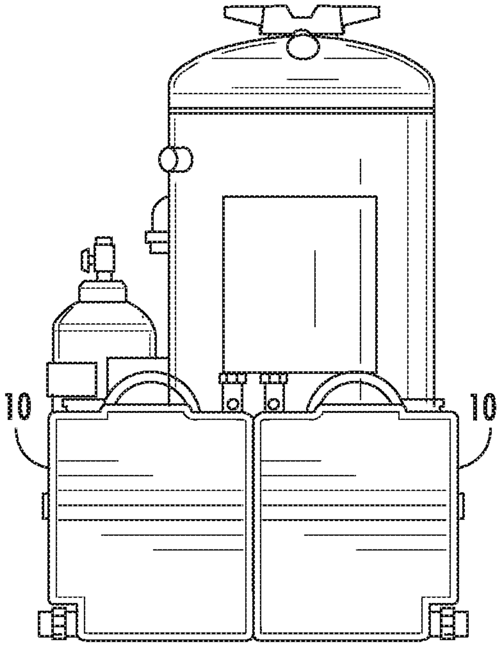
FIG. 12 is a perspective view of an example of a second arrangement of multiple modular storage tank assemblies.
Figure 13:
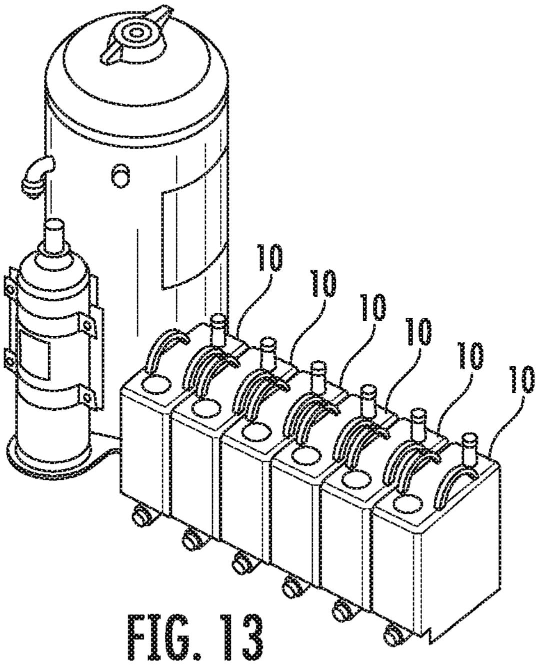
FIG. 13 is a perspective view of an example of a third arrangement of multiple modular storage tank assemblies.
Figure 14:
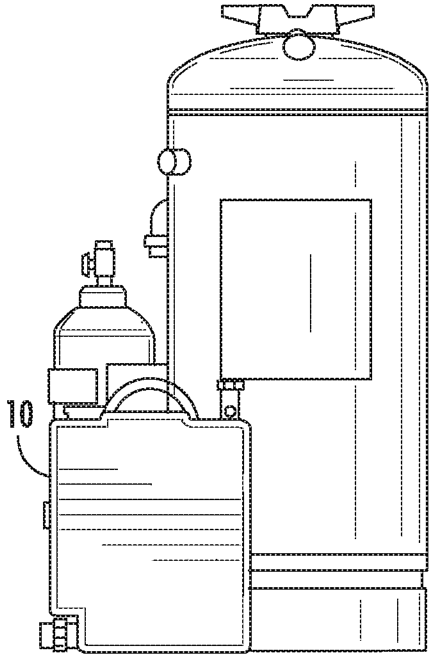
FIG. 14 is a perspective view of an example of a third arrangement of multiple modular storage tank assemblies.
Figure 15:
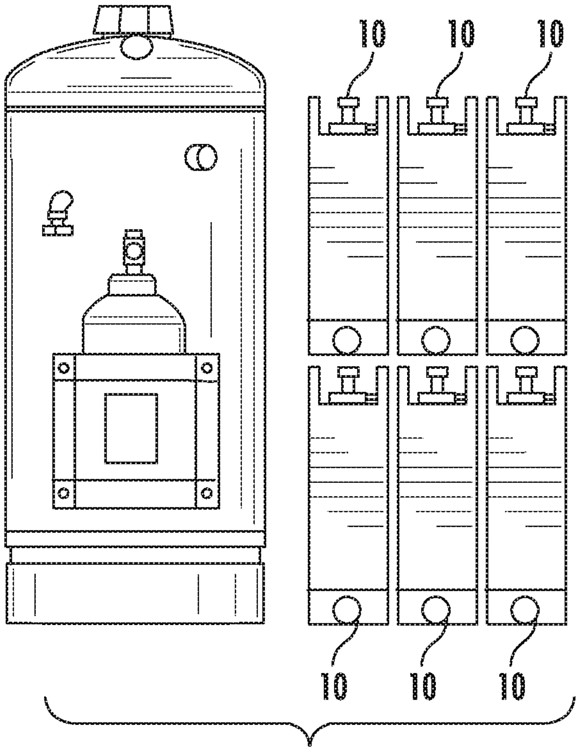
FIG. 15 is a perspective view of an example of a fourth arrangement of multiple modular storage tank assemblies.
Figure 16:
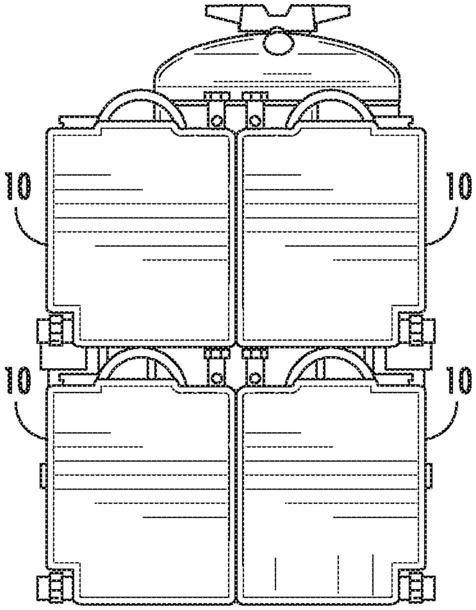
FIG. 16 is a perspective view of an example of a fourth arrangement of multiple modular storage tank assemblies.

Referring to FIGS. 9-16, various arrangements of one or more modular storage tank assemblies 10 are shown. The arrangements can include any number of the modular storage tank assemblies 10, and can include more than one of the positions described below. The modular storage tank assemblies 10 can be positioned side-by-side immediately adjacent to each other (e.g., as shown in FIGS. 13 and 14) to form a row of modular storage tank assemblies 10. The modular storage tank assemblies 10 can be stacked both side-by-side and front to back/front to front/back to back (e.g., as shown in FIGS. 11 and 12) to form a grid-like arrangement. The modular storage tank assemblies 10 can be stacked on top of each other, in addition to being stacked side by side, font to back, etc. (e.g., as shown in FIGS. 9, 10, 15, and 16). The modular storage tank assemblies 10 may include features that facilitate the various modes of stacking and/or inhibit relative movement of adjacent modular storage tank assemblies 10. Further, the modular storage tank assemblies 10 may be stacked immediately adjacent and/or touching each other. The modular storage tank assemblies 10 may be arranged closely, but in a spaced apart manner (e.g., spaced by predetermined amounts, spaced by spacers provided on the modular storage tank assemblies 10, etc.).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one imple-mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act, or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical, or other positioning or orientation descriptions include variations within +/−10% or +/−10 degrees of pure vertical, parallel, or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B' can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A fire suppression system, comprising:

a plurality of modular storage tank assemblies, each modular storage tank assembly including a body formed by a plurality of planar wall portions, structured to contain a quantity of fire suppression agent;

wherein the body further comprises a first set of support members extending along at least a first surface of at least one of the plurality of planar wall portions in an open-ended u-shape and a second set of support members extending along at least a second surface of at least one of the plurality of planar wall portions in an open-ended u-shape, wherein the first set of support members extends perpendicular to the second set of support members, wherein the second surface is disposed opposite the first surface, and wherein the first set of support members extends from the first surface toward the second surface and the second set of support members extends from the second surface toward the first surface such that the first set of support members are disposed in an overlapping arrangement with the second set of support members;

at least one cartridge assembly coupled to at least one modular storage tank assembly of the plurality of modular storage tank assemblies to release the fire suppression agent from the at least one modular storage tank assembly;

a plurality of nozzles positioned to receive the fire suppression agent from the at least one modular storage tank assembly; and a controller configured to control actuation of the at least one cartridge assembly.

2. The fire suppression system of claim 1, wherein each modular storage tank assembly is positioned relative to a second modular storage tank assembly such that a side portion of the modular storage tank assembly is parallel to and disposed to contact a side portion of the second modular storage tank assembly.

3. The fire suppression system of claim 2, wherein each modular storage tank assembly comprises a first flange and a second flange each having at least one fastener aperture.

4. The fire suppression system of claim 3, wherein each fastener aperture of a first modular storage tank assembly aligns with a fastener aperture of the second modular storage tank assembly and a fastener extends through the fastener aperture of the first modular tank and the fastener aperture of the second modular storage tank assembly to couple the first modular storage tank assembly to the second modular storage tank assembly.

5. The fire suppression system of claim 3, wherein the first flange comprises at least one handle.

6. The fire suppression system of claim 3, wherein the second flange comprises at least one handle and at least one cutout.

7. The fire suppression system of claim 6, wherein the at least one cutout is disposed within a bottom portion of the body.

8. The fire suppression system of claim 1, wherein the at least one cartridge assembly is remote of the at least one modular storage tank assembly.

9. The fire suppression system of claim 1, wherein each cartridge assembly of the at least one cartridge assembly fluidly couples to two or more modular storage tank assemblies of the plurality of modular storage tank assemblies.

10. The fire suppression system of claim 1, further comprising a first inlet aperture and a first outlet aperture defined by the body of each modular storage tank assembly, wherein the first inlet aperture is positioned in a first corner of a first side of the body, and the first outlet aperture is positioned in a second corner of the first side of the body.

11. The fire suppression system of claim 10, wherein the first corner of the first side is opposite the second corner of the first side of each modular storage tank assembly.

12. The fire suppression system of claim 11, further comprising a second inlet aperture and a second outlet aperture defined by the body of each modular storage tank assembly, wherein the second inlet aperture is positioned in a first corner of a second side of the body, and the second outlet aperture is positioned in a second corner of the second side of the body.

13. The fire suppression system of claim 12, wherein the first corner of the second side is opposite the second corner of the first side of each modular storage tank assembly.

14. The fire suppression system of claim 1, wherein the body comprises a first shell member and a second shell member joined by a seam, wherein the first shell member comprises a single wall of the plurality of planar wall portions and the second shell member comprises a remainder of the plurality of planar wall portions.

15. The fire suppression system of claim 1, further comprising:

a conduit fluidly coupled to each of the plurality of nozzles; and a plurality of actuators, each of the plurality of actuators coupled to a corresponding modular storage tank assembly of the plurality of modular storage tank assemblies;

wherein the at least one cartridge assembly comprises a plurality of cartridge assemblies;

wherein each of the plurality of cartridge assemblies is coupled to a corresponding modular storage tank assembly of the plurality of modular storage tank assemblies; and wherein the conduit is configured to receive a quantity of fire suppression agent from the body of each of the plurality of modular storage tank assemblies and direct the quantity of fire suppression agent to the plurality of nozzles.

16. The fire suppression system of claim 1, wherein each of the first set of support members and each of the second set of support members is structured to include a base portion and two elongated portions extending from the base portion, the base portion and two elongated portions defining the u-shape;

wherein terminal ends of the two elongated portions of the first set of support members are structured to terminate at the first surface and the base portion of the first set of support members extends toward the second surface; and wherein terminal ends of the two elongated portions of the second set of support members are structured to terminate at the second surface and the base portion of the second set of support members extends toward the first surface.

* * * * *